United States Patent
Fu (10) Patent No.: US 8,908,281 B2
(45) Date of Patent: Dec. 9, 2014

(54) OPTICAL SPLITTING DEVICE, OPTICAL MULTIPLEXING DEVICE AND METHOD, AND OPTICAL ADD-DROP MULTIPLEXER

(71) Applicant: Huawei Technologies Co., Ltd., Shenzhen, Guangdong (CN)

(72) Inventor: Zhenghua Fu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/682,266

(22) Filed: Nov. 20, 2012

(65) Prior Publication Data
US 2013/0077177 A1    Mar. 28, 2013

Related U.S. Application Data

(63) Continuation of application No. PCT/CN2011/077111, filed on Jul. 13, 2011.

(51) Int. Cl.
*G02B 27/14* (2006.01)
*G02B 6/293* (2006.01)
*G01J 3/12* (2006.01)

(52) U.S. Cl.
CPC ........... *G02B 27/14* (2013.01); *G02B 6/29365* (2013.01); *G02B 27/142* (2013.01); *G01J 2003/1243* (2013.01)
USPC ........................................................ 359/634

(58) Field of Classification Search
CPC ............ G01J 2003/1243; G02B 27/14; G02B 27/142; G02B 6/29365
USPC ........................................................ 359/634
See application file for complete search history.

(56) References Cited

U.S. PATENT DOCUMENTS 6,008,920 A * 12/1999 Hendrix .......................... 398/79
6,147,806 A    11/2000 Park et al.
(Continued)

FOREIGN PATENT DOCUMENTS

CN    1204778 A    1/1999
CN    201207104 Y    3/2009
(Continued)

OTHER PUBLICATIONS

Communication from a foreign counterpart application, International Application No. PCT/CN2011/077111, English Translation, International Search Report dated Mar. 29, 2012, 3 pages.
(Continued)

*Primary Examiner* — Scott J Sugarman
*Assistant Examiner* — Vipin Patel
(74) *Attorney, Agent, or Firm* — Conley Rose, P.C.; Grant Rodolph; Nicholas K. Beaulieu (57) ABSTRACT

Embodiments of the present invention provide an optical splitting device, an optical multiplexing device and method, and an optical add-drop multiplexer, which relate to the technical field of communications, and are invented for improving the performance and decreasing the cost. The optical splitting device includes a substrate, where an anti-reflective coating is disposed on an upper surface of the substrate and a filter membrane is disposed at a lower surface of the substrate; and further includes a light redirecting portion disposed opposite to the filter membrane. An optical signal is incident to the filter membrane at a first specified angle, a light wave of a first wavelength in the optical signal penetrates the filter membrane, so that the light wave of the first wavelength is separated from the optical signal.

20 Claims, 5 Drawing Sheets

(56) References Cited

U.S. PATENT DOCUMENTS

| | | |
|---|---|---|
| 6,188,816 B1 | 2/2001 | Solheim |
| 6,292,298 B1 | 9/2001 | Glance |
| 6,404,947 B1 | 6/2002 | Matsuda |
| 6,792,211 B1 | 9/2004 | Chang et al. |
| 7,092,587 B1 * | 8/2006 | Denis .......................... 385/14 |
| 2003/0002101 A1 | 1/2003 | Kropp et al. |

FOREIGN PATENT DOCUMENTS

| | | |
|---|---|---|
| JP | 2001141924 A | 5/2001 |
| JP | 2007058102 A | 3/2007 |
| WO | 9946879 A1 | 9/1999 |
| WO | 0120387 A1 | 3/2001 |

OTHER PUBLICATIONS

Foreign Communication From a Counterpart Application, Chinese Application 201180001273.2, Chinese Office Action dated Dec. 18, 2012, 7 pages.

Foreign Communication From a Counterpart Application, Chinese Application 201180001273.2, Partial English Translation of Chinese Office Action dated Dec. 18, 2012, 5 pages.

Foreign Communication From a Counterpart Application, European Application No. 11858072.9, Extended European Search Report dated Feb. 24, 2014, 7 pages.

* cited by examiner

OPTICAL SPLITTING DEVICE, OPTICAL MULTIPLEXING DEVICE AND METHOD, AND OPTICAL ADD-DROP MULTIPLEXER

CROSS-REFERENCE TO RELATED APPLICATIONS

This application is a continuation of International Application No. PCT/CN2011/077111, filed on Jul. 13, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the technical field of optical communications, and in particular, to an optical splitting device, an optical multiplexing device and method, and an optical add-drop multiplexer.

BACKGROUND

Optical communications play a more and more important role in modern communications technologies. Light of different wavelengths needs to be split or multiplexed on an uplink, a node, and a downlink for optical transmission, to implement uploading and downloading of optical signals of different wavelengths.

In the conventional art, a method of connecting splitters in tandem, or an array waveguide grating (AWG) technology is mainly used to split or multiplex the light of different wavelengths.

In the method of connecting splitters in tandem, a filter technology is used, and by using a three-port apparatus, a light wave of a certain wavelength can be separated from an optical signal multiplexing light waves of multiple wavelengths, or a light wave of a certain wavelength can be multiplexed with an incident light wave. When light waves of multiple wavelengths are required to be separated or multiplexed, multiple three-port apparatuses need to be connected in tandem by an optical fiber. Due to the requirement for tandem connection by an optical fiber, an inherent fiber coiling space of the optical fiber causes a bulky volume of a whole optical add-drop multiplexer, so that the performance is poor; furthermore, add-drop multiplexing of each light needs to be implemented by one three-port apparatus, so that the costs are high when more channels exist.

The AWG technology mainly uses a waveguide technology to allow the light of different wavelengths to form energy concentration at different side emission positions after passing through different paths, thereby separating the light of different wavelengths. However, the optical add-drop multiplexer is sensitive to temperature, has poor performance parameters, and requires an electrically controlled heater; and furthermore, the fabrication of an AWG chip is expensive, so that the costs are high.

SUMMARY

Embodiments of the present invention provide an optical splitting device, an optical multiplexing device and method, and an optical add-drop multiplexer, so as to improve the performance of the optical add-drop multiplexer and decrease the cost of the optical add-drop multiplexer.

To meet the preceding purpose, embodiments of the present invention use the following technical solutions:

An optical splitting device includes a substrate, where an anti-reflective coating is disposed on an upper surface of the substrate and a filter membrane is disposed at a lower surface of the substrate; and further includes a light redirecting portion disposed opposite to the filter membrane.

An optical signal is incident to the filter membrane at a first specified angle, a light wave of a first wavelength in the optical signal penetrates the filter membrane, so that the light wave of the first wavelength is separated from the optical signal, and a light wave other than the light wave of the first wavelength is reflected by the filter membrane to the light redirecting portion; and the light redirecting portion enables the light wave reflected to the light redirecting portion to be incident to the filter membrane at a second specified angle, and a light wave of a second wavelength in the optical signal penetrates the filter membrane, so that the light wave of the second wavelength is separated from the optical signal.

The second specified angle is different from the first specified angle, the first specified angle is an incident angle at which the optical signal is incident to the filter membrane when the filter membrane allows the penetration of the light wave of the first wavelength, and the second specified angle is an incident angle at which the optical signal is incident to the filter membrane when the filter membrane allows the penetration of the light wave of the second wavelength.

An optical add-drop multiplexer has an optical splitting device as provided in the present invention disposed in the optical add-drop multiplexer.

An optical splitting method includes: receiving an optical signal, and enabling the optical signal to be incident to a filter membrane at a first specified angle; by using the filter membrane, enabling a light wave of a first wavelength in the optical signal to penetrate the filter membrane, so that the light wave of the first wavelength is separated from the optical signal, and a light wave other than the light wave of the first wavelength in the optical signal is reflected by the filter membrane to a light redirecting portion; by using the light redirecting portion, enabling the light wave that is reflected by the filter membrane to the light redirecting portion to be incident to the filter membrane at a second specified angle; and by using the filter membrane, enabling a light wave of a second wavelength in the optical signal to penetrate the filter membrane, so that the light wave of the second wavelength is separated from the optical signal; where the second specified angle is different from the first specified angle, the first specified angle is an incident angle at which the optical signal is incident to the filter membrane when the filter membrane allows the penetration of the light wave of the first wavelength, and the second specified angle is an incident angle at which the optical signal is incident to the filter membrane when the filter membrane allows the penetration of the light wave of the second wavelength.

According to the optical splitting device and method, and the optical add-drop multiplexer provided in the embodiments of the present invention, by using the principle that when an optical signal multiplexing light waves of multiple wavelengths is incident to the filter membrane at a different angle, the wavelength of the light wave that is allowed to penetrate the filter membrane is different, a transmission direction of the light wave reflected by the filter membrane or the light wave penetrating the filter membrane is changed by the light redirecting portion, and the light wave having a changed transmission direction is incident to the filter membrane again at an angle different from the angle when being reflected from or penetrating the filter membrane. In this way, the light waves of different wavelengths are allowed to penetrate the same filter membrane at different positions by the light redirecting portion, so as to effectively separate multiple light waves of different wavelengths. The optical splitting device provided in the embodiment of the present invention has a reduced sensitivity to temperature change due to the independence from the waveguide technology, and requires no tandem connection of the optical splitting device because the splitting of the light waves of multiple wavelengths can be implemented merely by one optical splitting device, so that the material is saved, the volume of the optical add-drop multiplexer is reduced, and the packaging is simplified, thereby effectively improving the performance of the optical add-drop multiplexer and meanwhile decreasing the cost of the optical add-drop multiplexer.

An optical multiplexing device includes a substrate, an anti-reflective coating is disposed on an upper surface of the substrate, and a filter membrane is disposed at a lower surface of the substrate. A light redirecting portion disposed opposite to the filter membrane is further included.

A light wave of a first wavelength is incident to the filter membrane and penetrates the filter membrane; a light wave of a second wavelength is incident to the filter membrane at a third specified angle and penetrates the filter membrane, the light wave of the second wavelength penetrating the filter membrane is incident to the light redirecting portion, and the light wave of the second wavelength is made to be incident to the filter membrane at a fourth specified angle by the light redirecting portion; and the light wave of the second wavelength incident to the filter membrane at the fourth specified angle is reflected by the filter membrane, and encounters the light wave of the first wavelength penetrating the filter membrane, so as to implement multiplexing of the light wave of the first wavelength and the light wave of the second wavelength. The third specified angle is different from the fourth specified angle, and the third specified angle is an incident angle at which the light wave of the second wavelength is incident to the filter membrane when the filter membrane allows the penetration of the light wave of the second wavelength.

An optical add-drop multiplexer has an optical multiplexing device disposed in the optical add-drop multiplexer.

An optical multiplexing method includes: respectively receiving a light wave of a first wavelength and a light wave of a second wavelength, enabling the light wave of the first wavelength to be incident to a filter membrane, and enabling the light wave of the second wavelength to be incident to the filter membrane at a third specified angle; by using the filter membrane, enabling the light wave of the first wavelength to penetrate the filter membrane, and enabling the light wave of the second wavelength to penetrate the filter membrane and be incident to a light redirecting portion; by using the light redirecting portion, enabling the light wave of the second wavelength incident to the light redirecting portion to be incident to the filter membrane at a fourth specified angle; and by using the filter membrane, enabling the reflected light wave of the second wavelength that is incident at the fourth specified angle to encounter the light wave of the first wavelength penetrating the filter membrane, so as to implement multiplexing of the light wave of the first wavelength and the light wave of the second wavelength; where the third specified angle is different from the fourth specified angle, and the third specified angle is an incident angle at which the light wave of the second wavelength is incident to the filter membrane when the filter membrane allows the penetration of the light wave of the second wavelength.

According to the optical multiplexing device and method, and the optical add-drop multiplexer provided in the embodiments of the present invention, by using the principle that the wavelength of the light wave that is allowed to penetrate the filter membrane is different when the light waves are incident to the filter membrane at different angles, the light waves of different wavelengths are incident to the filter membrane at different angles and penetrate the filter membrane, and then are incident to the light redirecting portion, the light redirecting portion changes a transmission direction of the light waves penetrating the filter membrane, which are incident to the filter membrane again at an incident angle that is different from the incident angle when penetrating the filter membrane. Because the incident angle at this time is different from that during penetrating, the light waves do not penetrate but are reflected by the filter membrane. In this way, the light waves incident to the filter membrane at different angles may ultimately converge into one beam after transmission between the light redirecting portion and the filter membrane, and be emitted from the optical multiplexing device at the same angle. As a result, the multiplexing of multiple light waves of different wavelengths is effectively implemented, the sensitivity of the equipment to temperature change is reduced due to the independence from the waveguide technology, and no tandem connection of the optical multiplexing device is required because the multiplexing of the light waves of multiple wavelengths can be implemented merely by one optical multiplexing device, so that the material is saved, the volume of the optical add-drop multiplexer is reduced, and the packaging is simplified, thereby effectively improving the performance of the optical add-drop multiplexer and meanwhile decreasing the cost of the optical add-drop multiplexer.

BRIEF DESCRIPTION OF THE DRAWINGS

To illustrate the technical solutions in the embodiments of the present invention or in the conventional art more clearly, the accompanying drawings required for describing the embodiments or the conventional art are introduced below briefly. Apparently, the accompanying drawings in the following description merely show some embodiments of the present invention, and persons of ordinary skill in the art can derive other drawings from the accompanying drawings without creative efforts.

DETAILED DESCRIPTION

The technical solutions of the embodiments of the present invention are hereinafter described clearly and completely with reference to the accompanying drawings in the embodiments of the present invention. Evidently, the described embodiments are only some embodiments of the present invention, rather than all embodiments of the present invention. All the other embodiments obtained by a person skilled in the art without creative work based on the embodiments of the present invention shall fall into the protection scope of the present invention.

Figure 1:
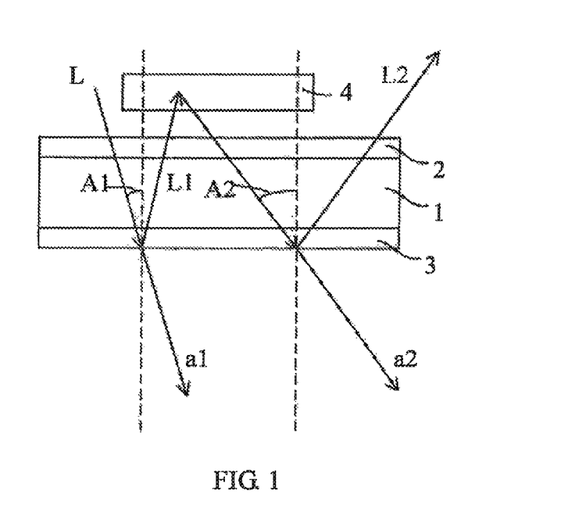
FIG. 1 is a schematic structural diagram of an optical splitting device provided in an embodiment of the present invention.

An embodiment of the present invention provides an optical splitting device. As shown in FIG. 1, the device includes a substrate 1, where an anti-reflective coating 2 is disposed on an upper surface of the substrate 1, a filter membrane 3 is disposed on a lower surface of the substrate 1, and a light redirecting portion 4 is disposed opposite to the filter membrane 3.

Figure 2:
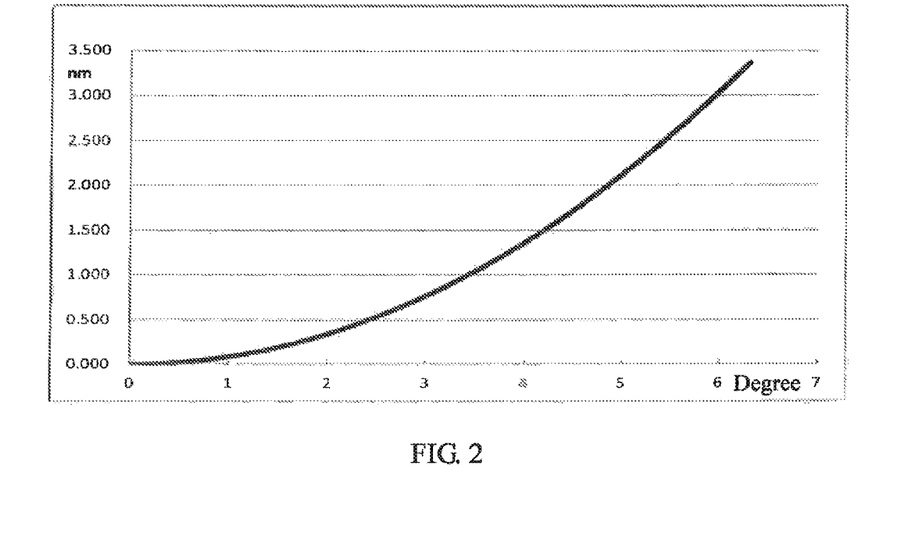
FIG. 2 is a schematic principle diagram of an optical splitting device provided in an embodiment of the present invention.

The optical splitting device provided in an embodiment of the present invention is designed by using the principle that for an optical signal multiplexing light waves of multiple wavelengths incident at different angles, wavelengths of a light wave that are allowed to penetrate the filter are different, that is, when the same optical signal multiplexing light waves of multiple wavelengths is incident to the filter membrane at different angles, wavelengths of a light wave passing through the filter membrane are different. For example, when an optical signal multiplexing light waves of multiple wavelengths is incident to a filter membrane at an incident angle of 0 degrees, the wavelength of a light wave that is allowed to penetrate the filter membrane is $\lambda$, and with the increase of the incident angle, the wavelength of the light wave that is allowed to penetrate the filter membrane is offset to some degree with respect to $\lambda$. For example, FIG. 2 shows a corresponding relationship between an offset of a penetrating wavelength and an incident angle for a filter membrane with respect to a light wave of the wavelength being 1550 nanometers (nm). As shown in FIG. 2, when the incident angle of the light wave is 0 degrees, the wavelength of the penetrating light wave has no offset, that is, the wavelength of the light wave that is allowed to penetrate the filter membrane is 1550 nm. When the incident angle of the light wave is 1.8 degrees, the wavelength of the penetrating light wave has an offset of 0.275 nm, and the wavelength of the light wave that is allowed to penetrate the filter membrane is 1550−0.275=1549.725 nm. In this case, except that the light wave with a wavelength of 1549.725 nm can penetrate the filter membrane, the light waves of other wavelengths are reflected.

It should be noted that in practical application, an electromagnetic wave with a single wavelength cannot be generated. Even a laser beam with the highest purity also has a certain wavelength distribution range. For example, if a laser beam with a wavelength of 1550 nm needs to be generated, a laser beam of 1549-1551 nm may be actually generated, but the light with the wavelength of 1550 nm has the maximum energy, which is referred to as a central wavelength. The wavelengths herein all refer to central wavelengths.

According to the principle mentioned above, as shown in FIG. 1, in the optical splitting device provided in an embodiment of the present invention, an optical signal L is incident to the filter membrane 3 at a first specified angle A1, where the first specified angle A1 is an incident angle required when the filter membrane 3 allows a light wave a1 of a first wavelength to penetrate, that is, an incident angle at which the optical signal L needs to be incident to the filter membrane 3. In this case, the light wave a1 of the first wavelength in the optical signal L penetrates the filter membrane 3, so as to separate the light wave a1 of the first wavelength from the optical signal L. A light wave L1 other than the light wave a1 of the first wavelength in the optical signal L is reflected by the filter membrane 3 to the light redirecting portion 4. After being processed by the light redirecting portion 4, the light wave L1 is reflected to the light redirecting portion 4 that is incident to the filter membrane 3 at a second specified angle A2, where the second specified angle A2 is different from the first specified angle A1. The second specified angle A2 is an incident angle required when the filter membrane 3 allows a light wave a2 of a second wavelength to penetrate, that is, an incident angle at which the light wave L1 in the optical signal L needs to be incident to the filter membrane 3. In this case, the light wave a2 of the second wavelength in the light wave L1 penetrates the filter membrane 3, so as to separate the light wave a2 of the second wavelength from the optical signal L1. In this situation, if besides the light wave a2 of the second wavelength, a light wave L2 of other wavelengths also exists in the optical signal L1, L2 is reflected by the filter membrane 3.

In this way, the light wave a1 of the first wavelength and the light wave a2 of the second wavelength are separated by the filter membrane 3 from the optical signal L multiplexing light waves of multiple wavelengths, so as to separate light waves of different wavelengths in the optical signal L.

It should be noted that the optical signal L multiplexes light waves of multiple wavelengths, that the optical signal L includes light waves of at least two different wavelengths, and that the light wave L1 and the light wave L2 include a light wave of at least one wavelength.

In summary, according to the optical splitting device provided in one embodiment of the present invention, by using the principle that when an optical signal multiplexing light waves of multiple wavelengths is incident to the filter membrane at a different angle, the wavelength of the light wave that is allowed to penetrate the filter membrane is different. This enables a transmission direction of the light wave reflected by the filter membrane or the light wave penetrating the filter membrane to be changed by the light redirecting portion, and the light wave with a changed transmission direction is incident to the filter membrane again at an angle different from the angle when being reflected from or penetrating the filter membrane. In this way, the light waves of different wavelengths are allowed to penetrate the same filter membrane at different positions by the light redirecting portion, so as to effectively separate multiple light waves of different wavelengths. The optical splitting device provided in the embodiment of the present invention has a reduced sensitivity to temperature change due to the independence from the waveguide technology, and requires no tandem connection of the optical splitting device because the separation of the light waves of multiple wavelengths can be implemented merely by one optical splitting device. Accordingly, the material is saved, the volume of the optical add-drop multiplexer is reduced, and the packaging is simplified, thereby effectively improving the performance of the optical add-drop multiplexer and meanwhile decreasing the cost of the optical add-drop multiplexer.

Optionally, the light redirecting portion 4 may be disposed at an upper surface side of the substrate 1, and disposed to be spaced, by the anti-reflective coating 2 and the substrate 1, from and opposite to the filter membrane 3, as shown in FIG. 1. In this case, specifically, in an embodiment of the present invention, the light redirecting portion may be directly disposed on the anti-reflective coating, or disposed at a certain distance from the anti-reflective coating.

Figure 3:
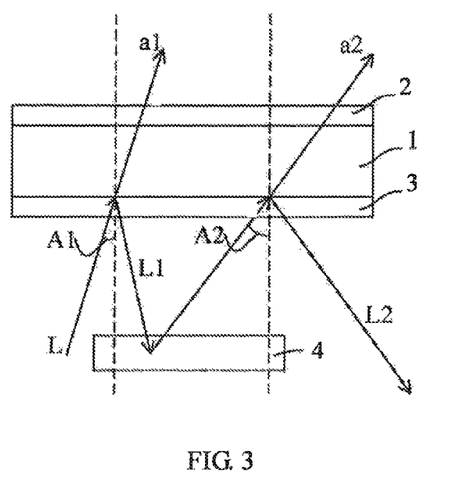
FIG. 3 is another schematic structural diagram of an optical splitting device provided in an embodiment of the present invention.

Alternatively, as shown in FIG. 3, the light redirecting portion 4 may also be disposed at a lower surface side of the substrate 1, and disposed to be opposite to the filter membrane 3. The optical signal L multiplexing light waves of multiple wavelengths is incident to the filter membrane 3 at the first specified angle A1. In this case, the light wave a1 of the first wavelength in the optical signal L penetrates the filter membrane 3 and the substrate 1, and emits from the anti-reflective coating 2, so as to separate the light wave a1 of the first wavelength from the optical signal L. A light wave L1 other than the light wave a1 of the first wavelength does not pass through the substrate 1, and is directly reflected by the filter membrane 3 to the light redirecting portion 4, thereby reducing the energy loss of the light wave L1 other than the light wave a1 of the first wavelength. After being processed by the light redirecting portion 4, the light wave L1 reflected to the light redirecting portion 4 is incident to the filter membrane 3 again at the second specified angle A2. In this case, the light wave a2 of the second wavelength in the light wave L1 penetrates the filter membrane 3 and the substrate 1, and emits from the anti-reflective coating 2, so as to separate the light wave a2 of the second wavelength from the optical signal L1, and a light wave L2 other than the light wave a2 of the second wavelength is reflected by the filter membrane 3. In this manner, when the light redirecting portion 4 is disposed at the lower surface side of the substrate 1, and disposed to be opposite to the filter membrane 3, the light wave a1 of the first wavelength and the light wave a2 of the second wavelength in the optical signal L multiplexing light waves of multiple wavelengths can also be separated by the filter membrane 3, so as to separate the light waves of different wavelengths in the optical signal L.

A specific disposition position of the light redirecting portion 4 is not limited in the present invention. Specifically, according to the difference in the number of the light waves to be separated, the number of light redirecting portions may also be varied, as long as the light redirecting portions meet the condition that after being emitted from one light redirecting portion, the light waves can be reflected by the filter membrane and then incident to a next light redirecting portion. The rest may be deduced by analog, until the light waves are emitted from the last light redirecting portion to the filter membrane, which is not limited in the present invention. Specifically, as shown in FIG. 1, when the number of light redirecting portions 4 is 1, separation of light waves of two different wavelengths in the optical signal L can be implemented, and the light wave L2 other than the light wave a1 of the first wavelength and the light wave a2 of the second wavelength is reflected by the filter membrane 3. In this case, if a light wave of a specified wavelength in L2 needs to be separated, another light redirecting portion may be added, so that the light wave L2 is incident to the newly added light redirecting portion, and the newly added light redirecting portion enables L2 to be incident to the filter membrane 3 at an angle that the filter membrane 3 allows the light wave of the specified wavelength to penetrate. Accordingly, the light wave of the specified wavelength is allowed to penetrate the filter membrane 3, so as to separate the light wave of the specified wavelength from L2. It can be seen that the implementation of optical add-drop multiplexing of three lights requires 2 light redirecting portions, and the implementation of optical add-drop multiplexing of four lights requires 3 light redirecting portions. Therefore, the number of light redirecting portions is 1 less than the number of the light waves to be separated.

In an optical communication system, 2, 4, or 8 light waves are generally separated or multiplexed. Thus, the number of light redirecting portions may be 1, 3 or 7. For example, in an embodiment of the present invention, if the number of the lights for optical add-drop multiplexing is 4, then 3 light redirecting portions need to be disposed in the optical splitting device. It should be noted that when two or more light redirecting portions exist, the light redirecting portions should be distributed at intervals, and the light redirecting portions should meet the condition that after emitting from one light redirecting portion, the light waves can be reflected by the filter membrane and then incident to a next light redirecting portion. The rest may be deduced by analog, until the light waves are emitted from the last light redirecting portion to the filter membrane.

Specifically, in an embodiment of the present invention, the light redirecting portion 4 is a reflecting mirror, and the reflecting mirror is disposed at a specified angle with respect to the substrate 1. Optionally, the reflecting mirror may be directly adhered to the substrate, or disposed to be separated from the substrate. Alternatively, the light redirecting portion 4 may also be a reflective coating directly formed on the substrate by a coating method, and the reflective coating is disposed at a specified angle opposite to the filter membrane. It should be noted that each of the reflecting mirrors is disposed at a specified angle opposite to the filter membrane, and their respective specified angles may be the same or different as long as the incident angle at which the light waves of the wavelengths to be separated are incident to the filter membrane is satisfied, which is not limited in the present invention.

It can be understood that besides the reflecting mirror, the light redirecting portion 4 may also be other optical devices capable of changing the transmission direction of light, such as a lens or prism, which is not limited in the present invention.

The optical splitting device provided in the present invention is described in detail below through a specific embodiment. It should be noted that all features of the foregoing embodiments are applicable to this embodiment.

Figure 4:
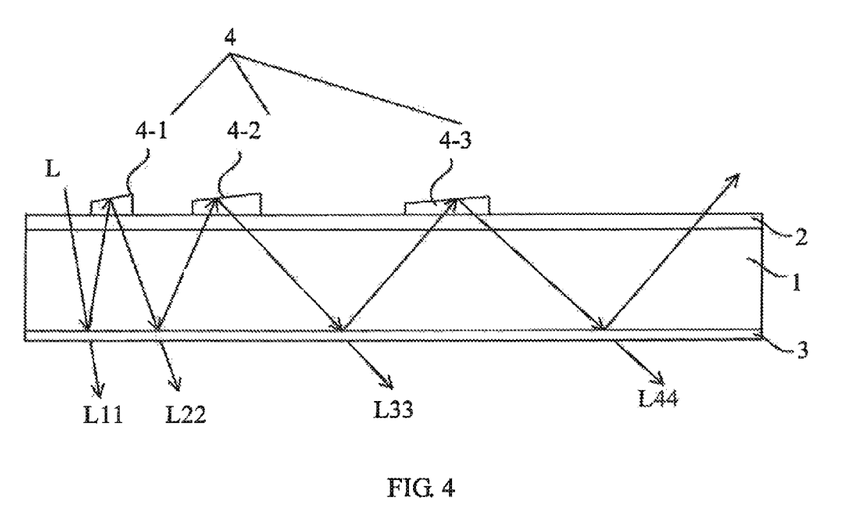
FIG. 4 is another schematic structural diagram of an optical splitting device provided in an embodiment of the present invention.

As shown in FIG. 4, an optical splitting device in this embodiment includes a substrate 1, an anti-reflective coating 2 disposed on an upper surface of the substrate 1, and a filter membrane 3 disposed on a lower surface of the substrate 1, and further includes a light redirecting portion 4. In this embodiment, the light redirecting portion 4 specifically includes reflecting mirrors 4-1, 4-2, and 4-3. Each of the reflecting mirrors is disposed to be spaced, by the anti-reflective coating 2 and the substrate 1, from and opposite to the filter membrane 3, and the reflecting mirrors are disposed at intervals, so that after emitting from one reflecting mirror, the light waves are reflected by the filter membrane and then incident to a next reflecting mirror.

An angle of the reflecting mirror 4-1 opposite to the filter membrane 3 is 0.88 degrees, an angle of the reflecting mirror 4-2 opposite to the filter membrane 3 is 0.57 degrees, and an angle of the reflecting mirror 4-3 opposite to the filter membrane 3 is 0.46 degrees.

As shown in FIG. 1, an optical signal L penetrates the anti-reflective coating 2 to the substrate 1, and is incident to the filter membrane 3 at an incident angle of 1.8 degrees. It can be known from FIG. 2 that, for the filter membrane 3, an offset of the penetrating wavelength corresponding to the incident angle of 1.8 degrees is 0.275 nm. Accordingly, when the incident angle is 1.8 degrees, the wavelength of the light wave that is allowed to penetrate the filter membrane 3 is 1550−0.275=1549.725 nm. Therefore, a light wave L11 with a wavelength of 1549.725 nm in the optical signal L penetrates the filter membrane 3, and light waves of other wavelengths are reflected by the filter membrane 3. The reflected light waves are incident to the anti-reflective coating 2 through the substrate 1, pass through the anti-reflective coating 2, are incident to the reflecting mirror 4-1, and are then reflected by the reflecting mirror 4-1 and are incident to the filter membrane 3 again. At this time, the incident angle is 1.8+2×0.88=3.56 degrees, when the light wave L is incident to the filter membrane 3 at this incident angle, an offset of the penetrating wavelength is 1.075 nm, and accordingly, the wavelength of the light wave that is allowed to penetrate the filter membrane 3 is 1550−1.075=1548.925 nm. Therefore, a light wave L22 with a wavelength of 1548.925 nm in the optical signal L emits from the filter membrane 3 and is separated, and the light waves not separated are reflected by the filter membrane 3 to the reflecting mirror 4-2. Likely, the incident angle of the light waves that are incident to the filter membrane 3 after they are reflected by the reflecting mirror 4-2 is 3.56+2×0.57=4.7 degrees, and an offset of the penetrating wavelength is 1.87 nm. In this case, the wavelength of the light wave that is allowed to penetrate the filter membrane 3 is 1550−1.87=1548.13 nm, and accordingly, a light wave L33 with a wavelength of 1548.13 nm can penetrate the filter membrane 3 and be separated. The light waves not separated are reflected by the filter membrane 3 to the reflecting mirror 4-3. The incident angle of the light waves that are incident to the filter membrane 3 after they are reflected by the reflecting mirror 4-3 is 4.7+2×0.46=5.62 degrees, and an offset of the penetrating wavelength is 2.67 am. In this case, the wavelength of the light wave that is allowed to penetrate the filter membrane 3 is 1550−2.67=1547.33 nm, so that a light wave L44 with a wavelength of 1547.33 am can penetrate the filter membrane 3 and be separated, and the light waves of other wavelengths are reflected by the filter membrane 3 and emit from the optical splitting device.

It should be noted that in this embodiment, the angle of each reflecting mirror opposite to the filter membrane is determined according to the wavelength of the light wave to be separated and the incident angle at which the light wave of the wavelength is incident to the filter membrane. The number of the reflecting mirror is determined according to the number of light waves to be separated. In other embodiments of the present invention, the angle of each reflecting mirror opposite to the filter membrane and the number of the reflecting mirror can be adjusted as required by optical splitting, which are not limited in the present invention.

In an embodiment, the optical path is reversible. Thus, when the transmission directions of the light waves in the optical splitting device in the foregoing embodiment are all reversed, the multiplexing of multiple light waves of different wavelengths can be implemented. According to the above principle, an embodiment of the present invention further provides an optical multiplexing device. Structural features of the optical multiplexing device are the same as those of the optical splitting device provided in the embodiments of the present invention, and all structural features of the optical splitting device provided in the embodiments of the present invention are applicable to the optical multiplexing device provided in the embodiment of the present invention.

Figure 5:
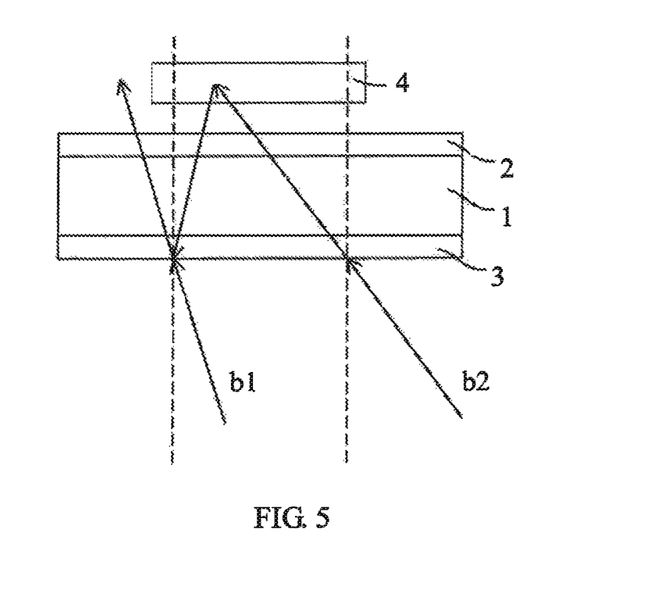
FIG. 5 is a schematic structural diagram of an optical multiplexing device provided in an embodiment of the present invention.

Specifically, as shown in FIG. 5, the optical multiplexing device in this embodiment includes a substrate 1, where an anti-reflective coating 2 is disposed on an upper surface of the substrate 1, a filter membrane 3 is disposed on a lower surface of the substrate 1, and a light redirecting portion 4 is disposed to be opposite to the filter membrane 3.

In the example shown in FIG. 5, a light wave b1 of a first wavelength is incident to the filter membrane 3 and penetrates the filter membrane 3. A light wave b2 of a second wavelength is incident to the filter membrane at a third specified angle and penetrates the filter membrane 3. The light wave b2 of the second wavelength penetrating the filter membrane 3 is incident to the light redirecting portion 4, and the light redirecting portion 4 enables the wave b2 of the second wavelength to be incident to the filter membrane 3 at a fourth specified angle. The light wave b2 of the second wavelength incident to the filter membrane 3 at the fourth specified angle is reflected by the filter membrane 3, and encounters the light wave b1 of the first wavelength penetrating the filter membrane 3. Thus, the example in FIG. 5 shows multiplexing the light wave b1 of the first wavelength and the light wave b2 of the second wavelength.

The third specified angle is different from the fourth specified angle, and the third specified angle is an incident angle at which the light wave of the second wavelength is incident to the filter membrane 3 when the filter membrane 3 allows the light wave b2 of the second wavelength to penetrate. Because the fourth specified angle is different from the third specified angle, the light wave b2 of the second wavelength does not penetrate the filter membrane when it is incident to the filter membrane at the fourth specified angle, but is reflected by the filter membrane, thereby encountering and being multiplexed with the light wave of the first wavelength.

According to the optical multiplexing device provided in the embodiment of the present invention, the wavelength of the light wave that is allowed to penetrate the filter membrane is different when the light waves are incident to the filter membrane at different angles. The light waves of different wavelengths are incident at different angles and penetrate the filter membrane, and then are incident to the light redirecting portion. The light redirecting portion changes a transmission direction of the light waves penetrating the filter membrane, which are then incident to the filter membrane again at an incident angle that is different from the incident angle when penetrating the filter membrane. Because the incident angle at this time is different from that during penetrating, the light waves do not penetrate but are reflected by the filter membrane. In this way, the light waves incident to the filter membrane at different angles may ultimately converge into one beam after transmission between the light redirecting portion and the filter membrane, and be emitted from the optical multiplexing device at the same angle. As a result, the multiplexing of multiple light waves of different wavelengths is effectively implemented, the sensitivity of the equipment to temperature change is reduced due to the independence from the waveguide technology, and no tandem connection of the optical multiplexing device is required because the multiplexing of the light waves of multiple wavelengths can be implemented merely by one optical multiplexing device. Thus, the material is saved, the volume of the optical add-drop multiplexer is reduced, and the packaging is simplified, thereby effectively improving the performance of the optical add-drop multiplexer and meanwhile decreasing the cost of the optical add-drop multiplexer.

According to the reversibility of the optical path, in the optical splitting device provided in the embodiment shown in FIG. 1, the light wave a1 of the first wavelength, and the light wave a2 of the second wavelength are incident respectively from respective original emission points in FIG. 1 to the filter membrane 3. The light wave a1 of the first wavelength penetrates the filter membrane 3. The light wave a2 of the second wavelength penetrates the filter membrane 3 and is incident to the light redirecting portion 4. The light wave a2 of the second wavelength is enabled, by the light redirecting portion 4, to be incident to the filter membrane 3 at an incident angle that is different from the incident angle at which the light wave a2 of the second wavelength is allowed to penetrate. After being reflected by the filter membrane 3, the light wave a2 of the second wavelength encounters the penetrating light wave a1 of the first wavelength, thereby multiplexing the light wave a1 of the first wavelength and the light wave a2 of the second wavelength, thus implementing the function of the optical multiplexing device.

It can be seen that, due to the reversibility of the optical path, the optical splitting device provided in the present invention can not only implement the optical splitting function, but can also implement the optical multiplexing function. Likewise, the optical multiplexing device can not only implement the optical multiplexing function, but can also implement the optical splitting function. Therefore, in an embodiment of the present invention, the optical splitting device or the optical multiplexing device can be configured to implement the optical splitting function or the optical multiplexing function. Alternatively, the optical splitting device or the optical multiplexing device can be configured to implement the optical splitting function and the optical multiplexing function, which is not limited in the present invention.

Correspondingly, an embodiment of the present invention further provides an optical add-drop multiplexer (OADM), and the optical splitting device or the optical multiplexing device provided in the embodiments of the present invention is disposed in the add-drop multiplexer.

According to the optical add-drop multiplexer provided in an embodiment of the present invention, when an optical signal multiplexing light waves of multiple wavelengths is incident to the filter membrane at different angles, the wavelength of the light wave that is allowed to penetrate the filter membrane is different. A transmission direction of the light wave reflected by the filter membrane or the light wave penetrating the filter membrane is changed by the light redirecting portion, and the light wave having a changed transmission direction is incident to the filter membrane again at an angle different from the angle when being reflected from or penetrating the filter membrane. In this way, the light waves of different wavelengths are enabled, by the light redirecting portion, to penetrate the same filter membrane at different positions, so as to effectively separate multiple light waves of different wavelengths. In addition, according to the reversibility of the light path, the separated light waves may return along original paths, and in this case, the multiplexing of light waves of different wavelengths can be implemented at an original incident position of the optical signal. The optical add-drop multiplexer provided in the embodiment of the present invention has a reduced sensitivity to temperature change due to the independence from the waveguide technology, and meanwhile requires no tandem connection of optical paths between the filter membranes because the separation and multiplexing of the light waves of multiple wavelengths can be implemented merely by one filter membrane. Thus, the material is saved, the volume of the optical add-drop multiplexer is reduced, and the packaging is simplified, thereby effectively improving the performance of the optical add-drop multiplexer and meanwhile decreasing the cost of the optical add-drop multiplexer.

Figure 6:
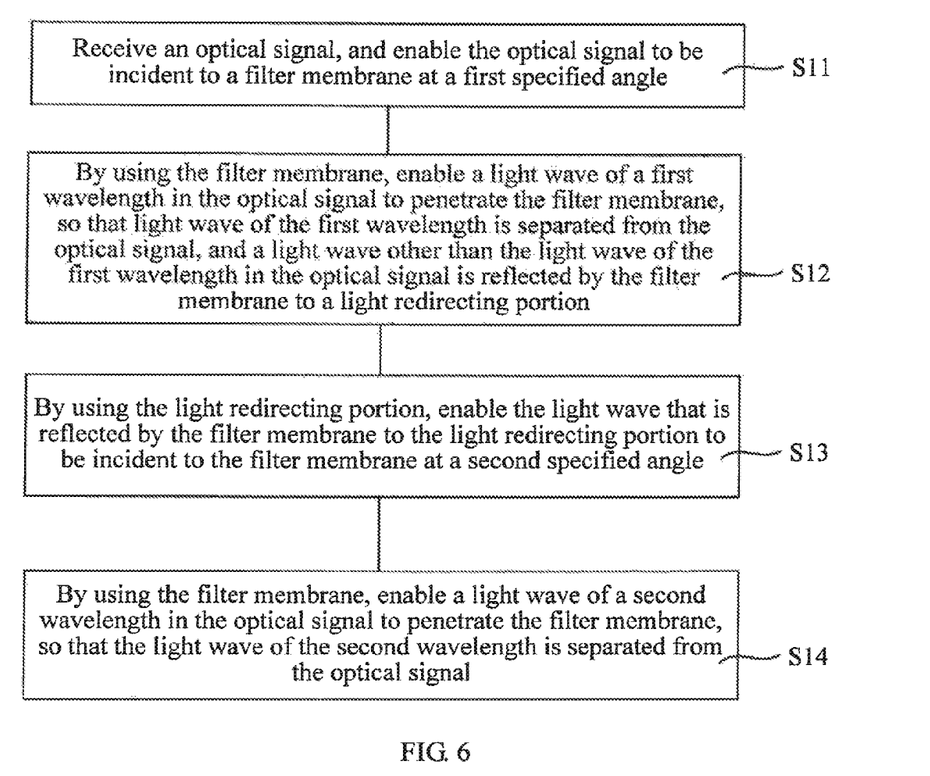
FIG. 6 is a flow chart of an optical splitting method provided in an embodiment of the present invention.

Correspondingly, as shown in FIG. 6, an embodiment of the present invention further provides an optical splitting method, which includes:

S11: Receive an optical signal, and enable the optical signal to be incident to a filter membrane at a first specified angle.

S12: By using the filter membrane, enable a light wave of a first wavelength in the optical signal to penetrate the filter membrane, so that the light wave of the first wavelength is separated from the optical signal, and a light wave other than the light wave of the first wavelength in the optical signal is reflected by the filter membrane to a light redirecting portion.

S13: By using the light redirecting portion, enable the light wave that is reflected by the filter membrane to the light redirecting portion to be incident to the filter membrane at a second specified angle.

S14: By using the filter membrane, enable a light wave of a second wavelength in the optical signal to penetrate the filter membrane, so that the light wave of the second wavelength is separated from the optical signal.

The second specified angle is optionally different from the first specified angle. The first specified angle is an incident angle at which the optical signal is incident to the filter membrane when the filter membrane allows the penetration of the light wave of the first wavelength, and the second specified angle is an incident angle at which the optical signal is incident to the filter membrane when the filter membrane allows the penetration of the light wave of the second wavelength.

According to the optical splitting method provided in the embodiment of the present invention, when an optical signal multiplexing light waves of multiple wavelengths is incident to the filter membrane at different angles, the wavelength of the light wave that is allowed to penetrate the filter membrane is different. A transmission direction of the light wave reflected by the filter membrane or the light wave penetrating the filter membrane is changed by the light redirecting portion, and the light wave having a changed transmission direction is incident to the filter membrane again at an angle different from the angle when being reflected from or penetrating the filter membrane. In this way, the light waves of different wavelengths are enabled, after being processed by the light redirecting portion, to penetrate the same filter membrane at different positions, so as to effectively separate multiple light waves of different wavelengths. The optical splitting method provided in the embodiment of the present invention reduces sensitivity of the optical add-drop multiplexer to temperature change due to the independence from the waveguide technology, and requires no tandem connection of the optical splitting device because the separation of the light waves of multiple wavelengths can be implemented merely by one optical splitting device. Thus, the material is saved, the volume of the optical add-drop multiplexer is reduced, and the packaging is simplified, thereby effectively improving the performance of the optical add-drop multiplexer and meanwhile decreasing the cost of the optical add-drop multiplexer.

In step S13, the light redirecting portion is used to enable the light wave that is reflected by the filter membrane to the light redirecting portion to be incident to the filter membrane at the second specified angle. This may include reflecting, by a reflecting mirror or a reflective coating, the light wave reflected by the filter membrane to the light redirecting portion, so that the light wave reflected by the filter membrane to the light redirecting portion is incident to the filter membrane at the second specified angle.

Figure 7:
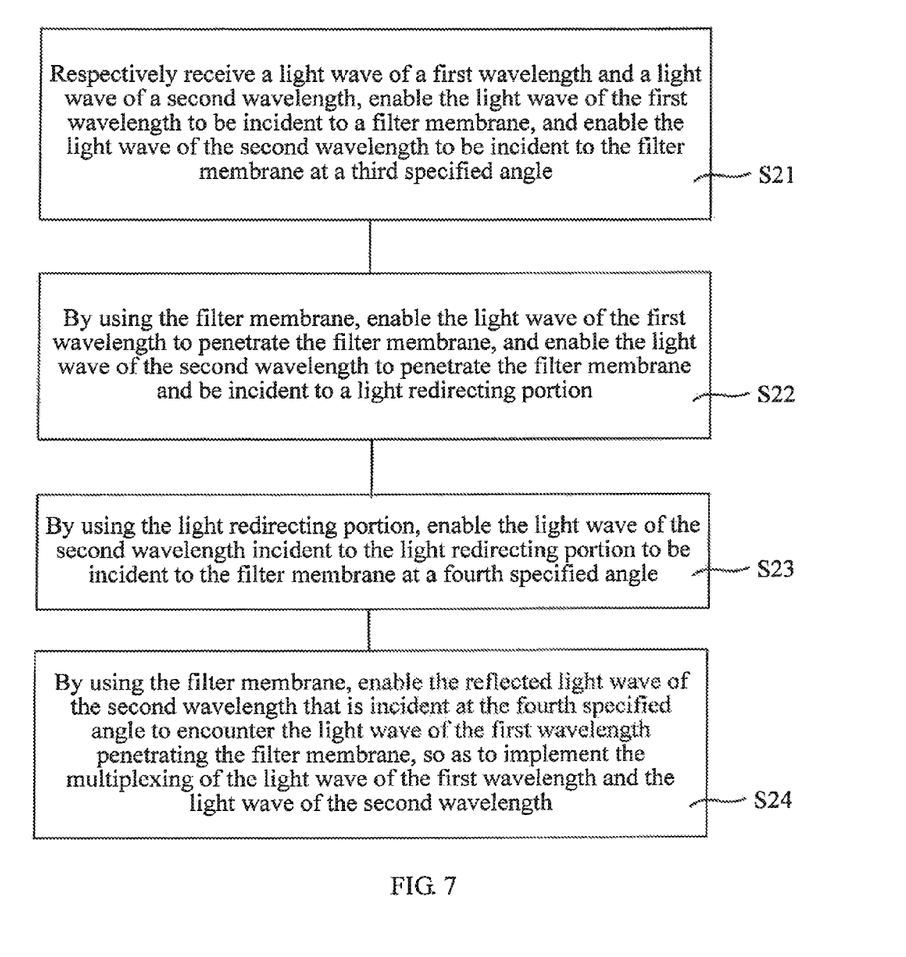
FIG. 7 is a flow chart of an optical multiplexing method provided in an embodiment of the present invention.

Correspondingly, an embodiment of the present invention further provides an optical multiplexing method, which, as shown in FIG. 7, includes:

S21: Respectively receiving a light wave of a first wavelength and a light wave of a second wavelength. Enabling the light wave of the first wavelength to be incident to a filter membrane, and enabling the light wave of the second wavelength to be incident to the filter membrane at a third specified angle.

S22: By using the filter membrane, enable the light wave of the first wavelength to penetrate the filter membrane, and enable the light wave of the second wavelength to penetrate the filter membrane and be incident to a light redirecting portion.

S23: By using the light redirecting portion, enable the light wave of the second wavelength incident to the light redirecting portion to be incident to the filter membrane at a fourth specified angle.

S24: By using the filter membrane, enable the reflected light wave of the second wavelength that is incident at the fourth specified angle to encounter the light wave of the first wavelength penetrating the filter membrane, so as to implement the multiplexing of the light wave of the first wavelength and the light wave of the second wavelength.

In an embodiment, the third specified angle is different from the fourth specified angle. The third specified angle is an incident angle at which the light wave of the second wavelength is incident to the filter membrane when the filter membrane allows the penetration of the light wave of the second wavelength. The light wave of the second wavelength does not penetrate the filter membrane when it is incident to the filter membrane at the fourth specified angle, but is reflected by the filter membrane.

According to the optical multiplexing method provided in the embodiment of the present invention, the wavelength of the light wave that is allowed to penetrate the filter membrane is different when the light waves are incident to the filter membrane at different angles. The light waves of different wavelengths are incident to the filter membrane at different angles and penetrate the filter membrane, and then are incident to the light redirecting portion. The light redirecting portion changes a transmission direction of the light waves penetrating the filter membrane, which are then incident to the filter membrane again at an incident angle that is different from the incident angle when penetrating the filter membrane. Because the incident angle at this time is different from that during penetrating, the light waves do not penetrate but are reflected by the filter membrane. In this way, the light waves incident to the filter membrane at different angles may ultimately converge into one beam after transmission between the light redirecting portion and the filter membrane, and be emitted from the optical multiplexing device at the same angle. As a result, the multiplexing of multiple light waves of different wavelengths is effectively implemented, the sensitivity of the equipment to temperature change is reduced due to the independence from the waveguide technology, and no tandem connection of the optical multiplexing device is required because the multiplexing of the light waves of multiple wavelengths can be implemented merely by one optical multiplexing device. Thus, the material is saved, the volume of the optical add-drop multiplexer is reduced, and the packaging is simplified, thereby effectively improving the performance of the optical add-drop multiplexer and meanwhile decreasing the cost of the optical add-drop multiplexer.

The enabling, by using the light redirecting portion, the light wave of the second wavelength incident to the light redirecting portion to be incident to the filter membrane at the fourth specified angle may specifically include reflecting, by a reflecting mirror or a reflective coating, the light wave of the second wavelength incident to the light redirecting portion, so that the light wave of the second wavelength is incident to the filter membrane at the fourth specified angle.

In conclusion, the above are merely specific implementation modes of the present invention. However, the protection scope of the present invention is not limited thereto. Changes or replacements readily apparent to a person skilled in the conventional art within the technical scope of the present invention should fall within the protection scope of the present invention. Therefore, the protection scope of the present invention is subject to the appended claims.

What is claimed is:
1. An optical splitting device comprising:
a substrate, wherein an anti-reflective coating is disposed on an upper surface of the substrate and a filter membrane is disposed at a lower surface of the substrate, wherein the substrate has an at least approximately constant thickness that separates the anti-reflective coating and the filter membrane, and wherein the anti-reflective coating and the filter membrane are parallel; and
a light redirecting portion disposed opposite to the filter membrane, wherein the anti-reflective coating is disposed between the light redirecting portion and the substrate, and wherein the light redirecting portion is spaced apart from the anti-reflective coating by a distance,
wherein the filter membrane is configured such that when an optical signal is incident to the filter membrane at a first specified angle, a light wave of a first wavelength in the optical signal penetrates the filter membrane such that the light wave of the first wavelength is separated from the optical signal, and a light wave other than the light wave of the first wavelength is reflected by the filter membrane to the light redirecting portion,
wherein the light redirecting portion is configured to enable the light wave reflected to the light redirecting portion to be incident to the filter membrane at a second specified angle,
wherein the filter membrane is configured such that when a light wave of a second wavelength in the optical signal penetrates the filter membrane, the light wave of the second wavelength is separated from the optical signal,
wherein the second specified angle is different from the first specified angle,
wherein the filter membrane is configured such that when the first specified angle is an incident angle at which the optical signal is incident to the filter membrane, the filter membrane allows the penetration of the light wave of the first wavelength, and
wherein the filter membrane is configured such that when the second specified angle is an incident angle at which the optical signal is incident to the filter membrane, the filter membrane allows the penetration of the light wave of the second wavelength.

2. The optical splitting device according to claim 1, wherein the optical splitting device comprises at least two light redirecting portions, and wherein the at least two light redirecting portions are disposed at intervals.

3. The optical splitting device according to claim 1, wherein the optical splitting device comprises a number of light redirecting portions, and wherein the number of light redirecting portions is selected from a group consisting of 1, 3, and 7.

4. The optical splitting device according to claim 1, wherein the light redirecting portion comprises a reflecting mirror or a reflective coating.

5. The optical splitting device according to claim 4, wherein the reflecting mirror or the reflective coating is disposed at a specified angle opposite to the filter membrane.

6. The optical splitting device according to claim 1, wherein the light redirecting portion comprises at least three light redirecting portions, wherein each of the at least three light redirecting portions is at a specified angle with respect to the filter membrane, and wherein the specified angles of the at least three light redirecting portions are different from each other.

7. An optical multiplexing device comprising:
a substrate, wherein an anti-reflective coating is disposed on an upper surface of the substrate, and a filter membrane is disposed at a lower surface of the substrate, wherein the substrate has an at least approximately constant thickness that separates the anti-reflective coating and the filter membrane, and wherein the anti-reflective coating and the filter membrane are parallel; and a light redirecting portion disposed opposite to the filter membrane, wherein the anti-reflective coating is disposed between the light redirecting portion and the substrate, and wherein the light redirecting portion is spaced apart from the anti-reflective coating by a distance, wherein the filter membrane is configured such that when a light wave of a first wavelength is incident to the filter membrane and penetrates the filter membrane, a light wave of a second wavelength is incident to the filter membrane at a third specified angle and penetrates the filter membrane, wherein the light wave of the second wavelength penetrating the filter membrane is incident to the light redirecting portion, wherein the light wave of the second wavelength is incident to the filter membrane at a fourth specified angle by the light redirecting portion, wherein the filter membrane is configured such that when the light wave of the second wavelength incident to the filter membrane at the fourth specified angle is reflected by the filter membrane and encounters the light wave of the first wavelength penetrating the filter membrane that multiplexing of the light wave of the first wavelength and the light wave of the second wavelength is implemented, wherein the third specified angle is different from the fourth specified angle, and wherein the filter membrane is configured to allow penetration of the light wave of the second wavelength when the third specified angle is an incident angle at which the light wave of the second wavelength is incident to the filter membrane.

8. The optical multiplexing device according to claim 7, wherein the optical multiplexing device comprises at least two light redirecting portions, and wherein the at least two light redirecting portions are distributed at intervals.

9. The optical multiplexing device according to claim 7, wherein the optical multiplexing device comprises a number of light redirecting portions, and wherein the number of light redirecting portions is selected from a group consisting of 1, 3, and 7.

10. The optical multiplexing device according to claim 7, wherein the light redirecting portion comprises a reflecting mirror or a reflective coating.

11. The optical multiplexing device according to claim 10, wherein the reflecting mirror or the reflective coating is disposed at a specified angle opposite to the filter membrane.

12. The optical splitting device according to claim 6, wherein each of the anti-reflective coating and the filter membrane runs along an entire length of the substrate.

13. The optical multiplexing device according to claim 7, wherein the light redirecting portion comprises at least three light redirecting portions, wherein each of the at least three light redirecting portions is at a specified angle with respect to the filter membrane, and wherein the specified angles of the at least three light redirecting portions are different from each other.

14. The optical multiplexing device according to claim 13, wherein each of the anti-reflective coating and the filter membrane runs along an entire length of the substrate.

15. An optical splitting method comprising:

receiving an optical signal at a substrate, wherein an anti-reflective coating is disposed on an upper surface of the substrate and a filter membrane is disposed at a lower surface of the substrate, wherein the substrate has an at least approximately constant thickness that separates the anti-reflective coating and the filter membrane, wherein the anti-reflective coating and the filter membrane are parallel, wherein a light redirecting portion is disposed opposite to the filter membrane, wherein the anti-reflective coating is disposed between the light redirecting portion and the substrate, and wherein the light redirecting portion is spaced apart from the anti-reflective coating by a distance;

enabling the optical signal to be incident to the filter membrane at a first specified angle;

utilizing the filter membrane to enable a light wave of a first wavelength in the optical signal to penetrate the filter membrane such that the light wave of the first wavelength is separated from the optical signal and a light wave other than the light wave of the first wavelength in the optical signal is reflected by the filter membrane to the light redirecting portion;

utilizing the light redirecting portion to enable the light wave that is reflected by the filter membrane to the light redirecting portion to be incident to the filter membrane at a second specified angle; and utilizing the filter membrane to enable a light wave of a second wavelength in the optical signal to penetrate the filter membrane such that the light wave of the second wavelength is separated from the optical signal, wherein the second specified angle is different from the first specified angle, wherein the first specified angle is an incident angle at which the optical signal is incident to the filter membrane when the filter membrane allows the penetration of the light wave of the first wavelength, and wherein the second specified angle is an incident angle at which the optical signal is incident to the filter membrane when the filter membrane allows the penetration of the light wave of the second wavelength.

16. The optical splitting method according to claim 15, wherein utilizing the light redirecting portion to enable the light wave that is reflected by the filter membrane to the light redirecting portion to be incident to the filter membrane at the second specified angle comprises reflecting, by a reflecting mirror or a reflective coating, the light wave reflected by the filter membrane to the light redirecting such that the light wave reflected by the filter membrane to the light redirecting portion is incident to the filter membrane at the second specified angle.

17. The optical splitting method according to claim 15, wherein each of the anti-reflective coating and the filter membrane runs along an entire length of the substrate, wherein the light redirecting portion comprises at least three light redirecting portions, wherein each of the at least three light redirecting portions is at a specified angle with respect to the filter membrane, and wherein the specified angles of the at least three light redirecting portions are different from each other.

18. An optical multiplexing method comprising:

receiving a light wave of a first wavelength and a light wave of a second wavelength at a substrate, wherein an anti-reflective coating is disposed on an upper surface of the substrate and a filter membrane is disposed at a lower surface of the substrate, wherein the substrate has an at least approximately constant thickness that separates the anti-reflective coating and the filter membrane, wherein the anti-reflective coating and the filter membrane are parallel, wherein a light redirecting portion is disposed opposite to the filter membrane, wherein the anti-reflective coating is disposed between the light redirecting portion and the substrate, and wherein the light redirecting portion is spaced apart from the anti-reflective coating by a distance;

enabling the light wave of the first wavelength to be incident to the filter membrane;

enabling the light wave of the second wavelength to be incident to the filter membrane at a third specified angle;

utilizing the filter membrane to enable the light wave of the first wavelength to penetrate the filter membrane and to enable the light wave of the second wavelength to penetrate the filter membrane and be incident to the light redirecting portion;

utilizing the light redirecting portion to enable the light wave of the second wavelength incident to the light redirecting portion to be incident to the filter membrane at a fourth specified angle; and utilizing the filter membrane to enable the reflected light wave of the second wavelength that is incident at the fourth specified angle to encounter the light wave of the first wavelength penetrating the filter membrane to implement multiplexing of the light wave of the first wavelength and the light wave of the second wavelength, wherein the third specified angle is different from the fourth specified angle, and wherein the third specified angle is an incident angle at which the light wave of the second wavelength is incident to the filter membrane when the filter membrane allows the penetration of the light wave of the second wavelength.

19. The optical multiplexing method according to claim 18, wherein utilizing the light redirecting portion to enable the light wave of the second wavelength incident to the light redirecting portion to be incident to the filter membrane at the fourth specified angle comprises reflecting, by a reflecting mirror or a reflective coating, the light wave of the second wavelength incident to the light redirecting such that the light wave of the second wavelength is incident to the filter membrane at the fourth specified angle.

20. The optical multiplexing method according to claim 18, wherein each of the anti-reflective coating and the filter membrane runs along an entire length of the substrate, wherein the light redirecting portion comprises at least three light redirecting portions, wherein each of the at least three light redirecting portions is at a specified angle with respect to the filter membrane, and wherein the specified angles of the at least three light redirecting portions are different from each other.

* * * * *